Sept. 22, 1942.   C. F. RAUEN   2,296,619
SPRAG
Filed Sept. 19, 1938   2 Sheets-Sheet 1

INVENTOR.
BY Carl F. Rauen
ATTORNEY.

Sept. 22, 1942.    C. F. RAUEN    2,296,619
SPRAG
Filed Sept. 19, 1938    2 Sheets-Sheet 2
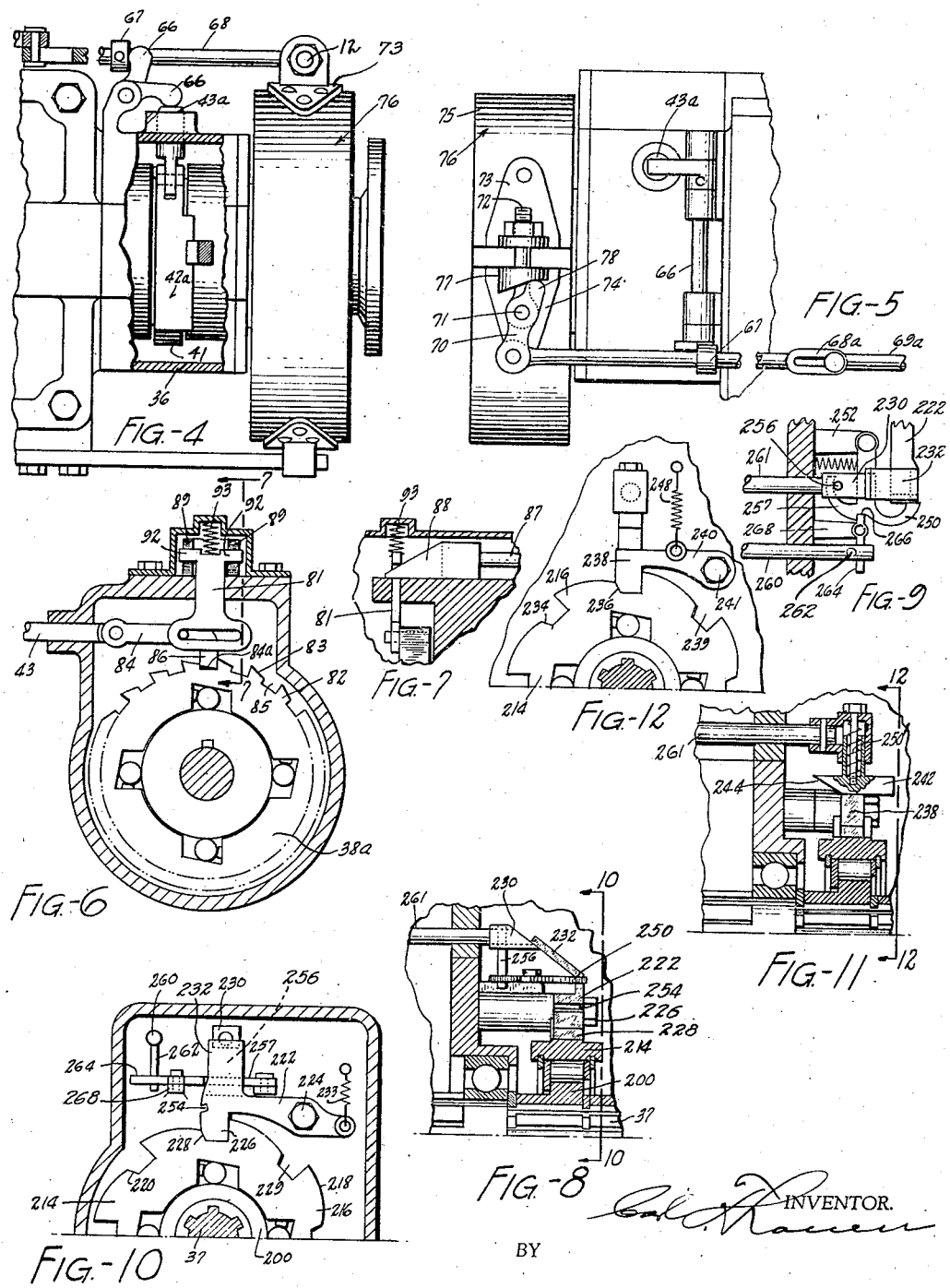

Patented Sept. 22, 1942

2,296,619

UNITED STATES PATENT OFFICE 2,296,619

SPRAG

Carl F. Rauen, Grosse Pointe, Mich.

Application September 19, 1938, Serial No. 230,641

61 Claims. (Cl. 192—4)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to sprags or automatic braking devices and has particular relation to mechanisms especially suitable for preventing motor vehicles from moving downgrade, when movement in such direction is not desired.

A principal object of the invention is to provide in the drive system of a motor vehicle, a separable lug and tooth mechanism with means to prevent engagement thereof during relative movement therebetween and under conditions which cause harmful shock to the drive system of the vehicle.

Another object of the invention is to provide in the drive system of a motor vehicle, a separable lug and tooth mechanism with means to facilitate engagement thereof under the conditions of operation hereinafter set forth.

A principal object of the invention is to provide a means automatically responsive to gravitational movement of the vehicle, for actuating the brakes thereof to prevent such movement, when the same is not desired.

Another object of the invention is to provide automatic means associated with the braking mechanism of a vehicle, for maintaining said mechanism operative subsequent to an operation of said mechanism which brings said vehicle to rest, so as to prevent gravitational movement of the vehicle either forwardly or reversely.

Another object of the invention is to provide means associated with the braking mechanism of the vehicle for maintaining the same applied after manual actuation thereof, said means being released by power-driving of said vehicle.

Another object of the invention is to provide means for overcoming the frictional force set up between the several parts of a sprag mechanism when this latter is employed in holding the vehicle in a stationary position upon any inclined surface such as a hill, so that when desired, change in the gear ratio may be effected.

Another object of the invention is to provide the propeller shaft of a vehicle with a mechanism which will permit the operation of such shaft only in one direction and which can be easily released when such is desirable and notwithstanding the large amount of force which may be exerted thereagainst when the vehicle tends to move rearwardly.

Another object of the invention is to provide a motor vehicle propeller shaft with an overrunning or one-way clutch mechanism having an element operative against the motor vehicle frame structure through a releasable shifting clutch and which has means incorporated therein for permitting the operation of the releasing mechanism manually and with a less amount of applied force than would ordinarily be required in overcoming the frictional resistance to movement of such parts.

Another object of the invention is to provide, in connection with the transmission mechanism of a motor vehicle or elsewhere, a sprag device which cannot be engaged when the vehicle is already moving rearwardly except at a relatively low speed, but which will automatically be engaged when the gear shift lever is in other than reverse position, but after the vehicle otherwise has been stopped.

Another object of the invention is to provide means for rendering the sprag device inoperative when the shift lever of the transmission is returned to neutral position and permitted to remain in such position subsequent to moving the shift lever out of reverse position so that the vehicle in which the device is incorporated may be moved rearwardly whenever such is desirable otherwise than through the agency of the engine of the vehicle.

The invention contemplates the use on the propeller shaft of a motor vehicle, of an overrunning clutch or some equivalent locking device, which will permit the rotation of the propeller shaft in a direction suitable for driving the vehicle forwardly, but which will secure the same rigidly to the vehicle frame when the propeller shaft tends to rotate in the opposite direction. In order to permit the driving of the vehicle rearwardly under the influence of the engine, the clutch is equipped with a shift mechanism under the manual control of the vehicle operator and which will render the clutch inoperative to prevent the opposite rotation of the shaft under such conditions.

This invention modifies the operation of the overrunning clutch mechanism under such circumstances and renders it easily releasable under the influence of the shift mechanism, notwithstanding the fact that the mechanism may be holding the vehicle against rearward motion.

For a better understanding of the invention, reference may now be had to the accompanying drawings forming a part of this specification and in which:

Fig. 4 is a plan view, partially broken away, illustrating the application of the actuating mechanism shown in Figs. 2 and 3 to a propeller shaft brake;

Fig. 5 is a side elevational view of the structure illustrated in Fig. 4;

Fig. 6 is a vertical sectional view, similar to Fig. 3 but illustrating a modified form of actuating mechanism;

Fig. 7 is a sectional view taken in a plane along the line 7—7 of Fig. 6;

Fig. 8 is a fragmentary sectional view illustrating a modified form of the invention;

Fig. 9 is a top plan view of the mechanism illustrated in Fig. 8 and showing mechanism for rendering the sprag device temporarily inoperative;

Fig. 10 is a cross-sectional view taken on the line 10—10 of Fig. 8;

Fig. 11 is a fragmentary sectional view illustrating another modification of the invention; and Fig. 12 is a cross-sectional view taken on the line 12—12 of Fig. 11.

Figure 1:
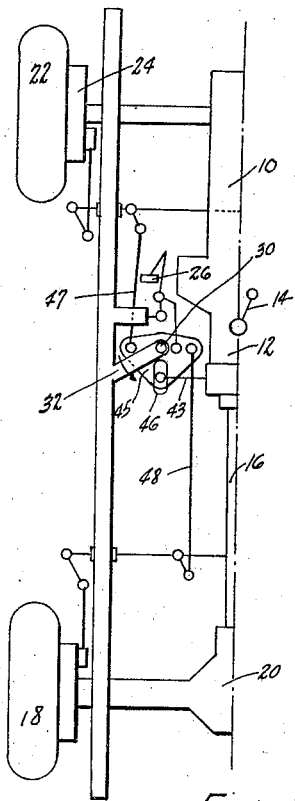
Fig. 1 is a diagrammatic illustration of a portion of a vehicle driving and braking system.

Referring now to Fig. 1 of the drawings, there is shown a diagrammatic drawing of a part of the driving and braking mechanism of a vehicle which comprises an engine 10, transmission 12 having a shift lever 14 for operating the same, a propeller shaft 16 operatively connected to a road wheel 18 through a differential 20 and a rear axle. A dirigible wheel 22 and driving wheel 18 have wheel brakes 24 associated therewith, said wheel brakes being actuated in any conventional manner such as by means of the brake linkage illustrated. The brake linkage is adapted to be actuated by a manually operable pedal 26 for applying the wheel brakes so as to control movement of the vehicle. The transmission 12 may be of the conventional type, having three forward speeds and one reverse speed and having a manually operable lever 14 for selecting the speed through which it is desired to drive the vehicle. The brake pedal 26 is connected to a bell crank 45 pivotally secured to a part of the vehicle frame at 30. The bell crank 45 has connected to it a link 47, leading to the front wheel brakes, for actuating the same, and a link 48, leading to the rear wheel brakes. Manipulation of the lever 26 will cause the bell crank to move in the direction indicated by the arrow 32, to apply the brakes. Bell crank 45 is further connected by a pin and slot connection 46 to a link 43 which, as hereinafter described, is connected to the actuating mechanism of the sprag device.

Figure 2:
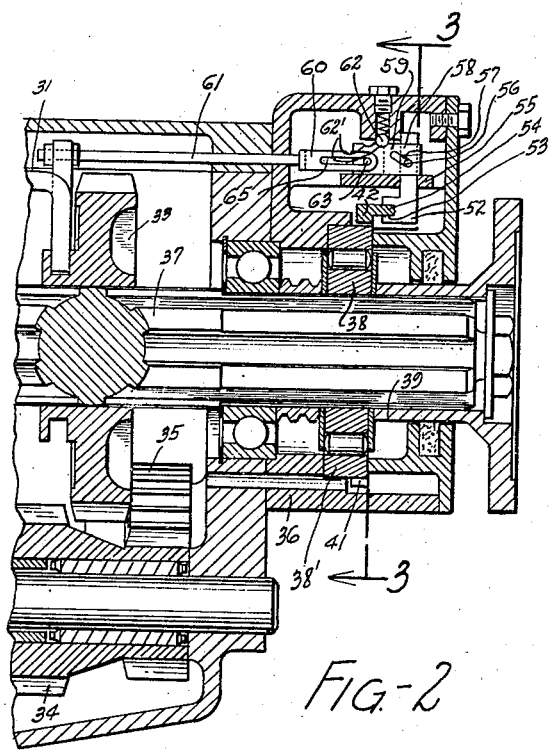
Fig. 2 is a vertical sectional view of a part of a vehicle transmission mechanism and the actuating mechanism of a sprag device associated with the tail shaft of such transmission.

The transmission 12 includes a low speed forward gear 34 and a reverse idler 35 which are adapted to be selectively connected to the tail shaft 37 of the transmission by a sliding gear 33 splined thereon. Gear 33 is shown in Fig. 2 in neutral position and between low and reverse gears and is adapted to be moved so as to bring the teeth thereof into mesh with the teeth of gear 34 to provide a low gear drive, and into mesh with the teeth of idler gear 35, to provide a reverse gear drive. Gear 32 is moved by shift lever 14 and through the instrumentality of a shift fork 31. Shaft 37 is journaled in a bearing in the rear wall of the transmission case and extends therebeyond.

A case 36 is bolted to the rear wall of the transmission case and encloses the projecting part of the tail shaft 37. Such case forms a housing for the actuating mechanism of the sprag device, and this mechanism comprises a one-way clutch, the sleeve 38 of which is splined to the tail shaft 37 and the cam 38' of which is arranged externally of sleeve 38. Clutch cam 38' is prevented from turning in a counter-clockwise direction (looking at Fig. 3), in respect to the sleeve or drum 38, by rollers 39 which are operatively disposed between the members 38 and 38'. These rollers 39 are held in position for instant action by the spring-actuated plungers 40 and are adapted to wedge between the opposed surfaces of the members 38 and 38' when the member 38 tends to rotate in a clockwise direction with respect to member 38'. However, when member 38 rotates in a counter-clockwise direction with respect to member 38', the rollers will permit such overrunning or relative rotation. Cam 38' is provided with gear teeth, lugs or radial projections 41 adapted to mesh with the teeth or lugs of the rack 42, which rack is pivoted to the rod 43 at 44.

As the rod or link 43 is connected to the wheel brakes through the linkage previously described, it will be seen that when the shaft 37 rotates in a clockwise direction, the rack 42 will be moved to the right (Fig. 3), which will cause bell crank 45 to rotate in the direction of arrow 32 and apply the brakes through the rods 47 and 48, thereby bringing the vehicle to a stop. When shaft 37 is rotated in a counter-clockwise direction (Fig. 3), the pull on the link 43 by the rack 42 is eliminated by reason of the one-way clutch, and cam 38' is returned to its normal position under the influence of the usual brake springs. When the brakes are applied manually by actuation of the pedal 26, rack 42 will be moved to the right, due to rotation of bell crank 45 in the direction of arrow 32, and this will cause the cam 38' of the clutch to rotate clockwise (Fig. 3) and relative to the drum 38 and shaft 37. Rollers 39, backed up by the spring-pressed plungers 40, will move so as to follow the cam member 38', so that such member 38' cannot rotate counter-clockwise (Fig. 3) relative to the drum 38 when the brake pedal 26 is released. As operation of the brake pedal 26 will apply the brakes, the one-way clutch mechanism and its connection with the brake linkage will maintain the brakes applied after the same have been applied manually, to bring the vehicle to rest. Driving of the shaft 37 in a counter-clockwise direction, such as when the vehicle is driven forwardly, will cause the rollers 39 to move out of wedging engagement and effect the release of the wheel brakes.

In order that a vehicle equipped with this device on the propeller shaft may be driven backward, I provide a means for lifting the teeth of rack 42 out of engagement with the gear teeth 41, so that the cam member 38' may turn in a clockwise direction, which corresponds to reverse driving of the vehicle. This is accomplished preferably by the gear shift mechanism when the gears are shifted to reverse, as will now be described. A member 52 is provided with a slot 53 adapted to engage a stepped part 54 of the rack 42. The slot 53 is rounded, so that the stepped part 54 can rock when the member 52 is moved vertically in the guide 55. A pin 56 extends from both sides of the member 52 and protrudes through slots 57 provided in the arms 58 of a bifurcated detent member 59. Straddling the member 59 is a bifurcated member 60, fastened to an extension 61 of the fork 31, which shifts the gear 33 for low and reverse drives. A spring-pressed detent 62 cooperates with a pair of notches 62', for holding the rack 42 in its proper position.

When the lever 14 is actuated to shift gear 33 into mesh with reverse idler gear 35, the member 60 co-operating with the pin 63, which pin is anchored in the detent member 59, shifts the member 59 to the right (Fig. 2), causing member 52 to lift the teeth of the rack 42 out of mesh with the teeth 41 of the cam member 38', due to the action of the slots 57 on the pin 56. The left hand end of slot 65 in member 60 will not contact pin 63 until toward the end of the shifting movement of gear 33 into its reverse position. In other words, the member 60 will cooperate with the pin 63 at the end of the shifting movement of gear 33 into reverse position, to shift member 59 to the right so as to disengage the teeth of rack 42 from the teeth of the member 38'. When the rack 42 is out of mesh with the teeth of the cam member 38', it is held from re-meshing by the action of the spring-pressed detent 62 and the left hand notch 62'. Rack 42 will remain out of mesh even when the gear 33 is returned to neutral, due to the fact that the right hand end of the slot 65 in the member 60 will not contact the pin 63 until the gear 33 is in neutral. This is done so that the sprag device cannot be reset and suddenly stop the car or break some of the parts if the gear 33 should be pulled out of mesh with the gear 35 while the car is moving backwardly. When the gear 33 is shifted to mesh with the gear 34, through the medium of the shift fork 31, the right hand end of the slot 65 contacts the pin 63 and pulls the forked detent 59 to the position shown in Fig. 2, thereby permitting the teeth of the rack 42 to mesh with the teeth 41. Inasmuch as it is quite difficult to mesh the teeth of the gears 33 and 34 if the car is moving backwardly at any appreciable speed, the above arrangement, whereby it is necessary to shift to low gear before the sprag again becomes effective, will make sudden strains on the car mechanism practically impossible. The detent 62 will cooperate with the right hand notch 62', to prevent the slots 57 from being moved to the left (Fig. 2), under force of the member 52, resulting from the separating action of the gear teeth 38 and 41 when the sprag is in action. Conversely, it will therefore be seen that the teeth 38 and 41 can be easily released when under load, by shifting the transmission into reverse.

Figure 3:
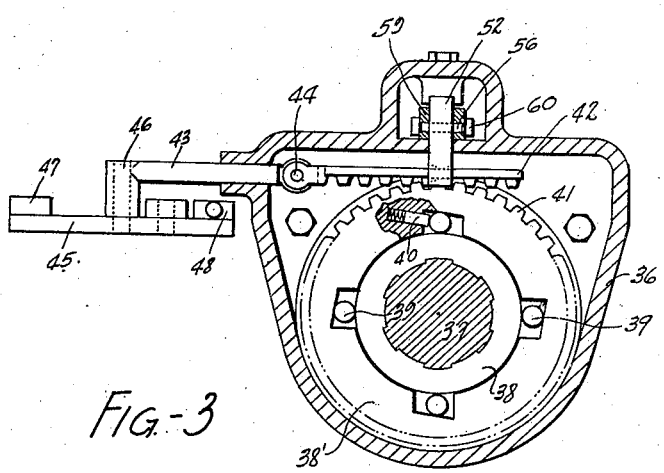
Fig. 3 is a vertical sectional view taken in a plane along the line 3—3 of Fig. 2.

In the form of the invention illustrated in Figs. 4 and 5, the actuating mechanism shown in Figs. 2 and 3 is utilized for the purpose of operating a propeller shaft brake which also may be manually operated by the conventional parking brake lever. In this modification, the construction of the actuating mechanism and the relationship thereof with the transmission are the same as illustrated in Figs. 2 and 3. The rack 42ª, however is connected to a link 43ª, which projects through an opening in the opposite side of the case 36. Link 43ª operates a bell crank 66, which is adapted to cooperate with a collar 67 fastened to a rod 68. One end of a rod 68 is connected through a pin and slot connection 68ª to a link 69ª leading to the parking brake lever, and the other end of rod 68 is pivotally connected to a lever 70 pivoted at 71 to the end of a bolt 72. The bolt 72 has a nut on the end thereof and passes through suitable openings provided in brackets 73 and 74 carried by the brake band 75 of the propeller shaft brake indicated generally at 76. The under side of bracket 74 is provided with a cam surface 77 which cooperates with the free end 78 of lever 70 upon movement thereof for contracting the band 75 and thereby applying brake 76. The propeller shaft brake 76 cooperates with a hub rotatably carried by the tail shaft of the transmission, and hence upon actuation of the brake 76, either by means of the parking brake lever or through the intermediary of rack 42ª, link 43ª, bell crank 66, collar 67, the vehicle will be brought to a stop. When the vehicle tends to drift backward down a hill, bell crank 66 is caused to turn counter-clockwise, looking at Fig. 4, and thereby apply the propeller shaft brake 76 independently of the parking or hand brake lever.

The operation of the form of invention illustrated in Figs. 4 and 5 is essentially the same as that of the form of invention illustrated in Figs. 1, 2 and 3.

In Figs. 6 and 7 there is shown a modification of the construction illustrated in Figs. 2 and 3 and wherein a different form of tooth, lug or projection is used on the cam member 38ª. Each tooth 82 is provided with a cam surface 83, as is also the dog, bolt or pawl 84 at 84ª. The slots 85 between each of the teeth 82 are made slightly larger than the tooth 86 on the pawl 84. If the gears of the transmisison are shifted from neutral to reverse, as previously explained, while the vehicle is moving backwardly, the tooth 86, due to its own cam surface and also the action of the cam surface 83, will jump across the slots 85 without falling therein, unless the cam member 38ª is moving with little or no speed. In this case, it is not necessary to shift into low before making the sprag device effective after being released for reverse, for it cannot be applied suddenly, due to the characteristics of teeth 86 and 82. When the rotary member 38ª turns in a counterclockwise direction, the beveled part 83 on one of the teeth 82 or the bevel 84 on lug 86 constitutes a means which will facilitate the engagement of the teeth 83 and 86 after the member 81 ceases to function. The foregoing action takes place because the pointed end of the beveled surface of the lug 86, for example, will project below and into the path of the wall which defines the trailing edge of the slot 85 at such time as member 38ª is turning in a counter-clockwise direction. The beveled surface 84ª on the lug can ride down the top of one of the teeth and thereby be guided into the slot where it is urged by means of the spring 93.

The construction illustrated in Figs. 6 and 7 is released for reverse when the gears are shifted to reverse position, in which case the rod 87, which is operated by the shift mechanism, moves the wedge member 88, which member has wedge-shaped arms 89 adapted to straddle the part 81 in such a manner that the wedge surfaces will engage the arms 92 of the member 81 and lift it, thereby pulling the pawl tooth 86 out of mesh with the teeth 82 of the member 38ª. The pawl tooth 86 remains out of mesh until the gears of the transmission are shifted to neutral and until the member 38ª has practically ceased to rotate in a clockwise direction, in which case spring 93 will cause the pawl tooth 86 to drop into a tooth space 85. Inasmuch as the pawl 84 causes the brakes to be applied, it can be readily lifted out of mesh when under load, as the frictional force to be overcome in pulling the pawl out of mesh is only that resulting from the force required to apply the brakes, whereas if the pawl 84 had to take the whole load of the car—that is, if it was pivoted on a fixed part of the transmission—it would be practically impossible to release it for reverse when under load. The pawl 84 is connected to a link such as 43 and thereby to the braking system of the vehicle for actuating the wheel brakes. It, of course, is to be understood that this form of mechanism could be used in connection with the modification illustrated in Figs. 4 and 5.

In the modification illustrated in Figs. 8, 9 and 10, the outer member or cam member 214 of the overrunning clutch is provided with a set of external radially projecting teeth 216, having faces 218 eccentrically disposed with respect to the axis of rotation of the member 216, and with beveled or tapered leading edges 220. A lever 222 pivotally secured at 224 to the transmission casing is provided with a head 226 having a beveled forward edge 228 and adapted to drop into any one of the slots 229 formed between the teeth 216. The beveled edges 220 on the teeth 216 and 228 on the head 226 are slightly below the angle of rest or repose for the materials out of which these parts are constructed; that is, the line of direction of the thrust or torque between the surfaces 220 and 228, due to the load of the vehicle, is at an angle to a line normal to said surfaces so that there is sufficient purchase between the tapered edges to hold the head 226 in the position shown, even though the member 216 may tend to rotate in a clockwise direction, due to a tendency of the vehicle in which the device is used, to move rearwardly.

In this modification, the braking mechanism of the vehicle is not utilized, but the cam 218 of an overrunning clutch mounted on the tail shaft of the transmission is adapted to be locked against reverse movement by the lug 226 and the teeth 216. The rear end of a rod 261, arranged to be moved positively with movement of the reverse gear 33, is provided with a cam member 230 which is adapted to engage an oppositely disposed cam member 232 provided on the lever 222 for the purpose of lifting head 226 thereof out of slot 229 when the shift lever of the transmission is moved to reverse gear position. A spring 233, connected at one end to the lever 222 and at the other end to the sprag casing, is provided for resiliently holding the head 226 in one of the slots 229 and in engagement with one of the teeth 216, so that when the rod 261 is moved forwardly (when the transmission is restored to neutral), the head 226 will be moved downwardly to engage one of the teeth 216, except as hereinafter described.

The eccentric faces 218 of the teeth 216 are adapted to prevent the head 226 from dropping into the notches 229 until the clockwise speed of rotation of the member 216 (Fig. 10) has practically been eliminated. It will, of course, be understood that when the vehicle is moving rearwardly, the member 214 will be locked to the member 200 of the overrunning clutch, which is rotating in a reverse direction with the tail shaft 37 of the transmission.

To permit the vehicle in which the sprag device has been incorporated to be moved rearwardly, whenever such is desirable, otherwise than through the agency of the engine of the vehicle, the modification illustrated in Figs. 8, 9 and 10 is provided with means for rendering the sprag device inoperative when the shift lever of the transmission is returned to neutral position and permitted to remain in such position subsequent to moving the shift lever out of reverse position.

To that end, a spring-biased lever 250 is pivotally secured to a lug 252 provided on the rearward wall of the transmission casing and is adapted to engage a notch 254 provided in the side of the cam member 232 when the head 226 of the lever 222 has been shifted out of engagement with one of the teeth 216 subsequent to manipulation of the shift lever to reverse position, as hereinbefore described. The low and reverse shift rod 261 is provided with a downwardly projecting pin 256, which is adapted to engage one arm 257 of the lever 250 when the rod 261 is moved forwardly to place the transmission in low gear ratio for the purpose of moving the lever 250 out of engagement with the notch 254, thereby to permit the head 226 of the lever 222 to be biased into engagement with one of the notches 229 provided between the teeth on the outer member 214 of the overrunning clutch.

Thus, if the shift lever is restored to neutral position subsequent to moving the same out of reverse, the lever 250 will hold the head 226 of the lever 222 out of engagement with the teeth 216, thereby permitting the vehicle in which the device has been incorporated to be moved rearwardly otherwise than through the agency of the engine of the vehicle.

The shift rod 260 for effecting high and intermediate speed gear in the transmission, is provided with a downwardly projecting pin 262 which is adapted to engage one arm of a lever 264, the other arm of which engages a notch 266 provided on the lever 250, whenever the rod 260 is moved rearwardly to place the transmission in an intermediate gear ratio for the purpose of moving the lever 250 out of engagement with notch 254, thereby to permit the head 226 of the lever 222 to engage one of the teeth 216, whereby the sprag device will again be operative to prevent undesirable rearward movement of the vehicle. Movement of the shift rod 260 to high gear position will not affect the lever 250, as the pin 262 will be moving away from the lever 264, which may be pivoted to a boss 268 rearwardly projecting from the sprag or transmission casing.

Referring now particularly to Figs. 11 and 12, the teeth 216 of the member 214 are provided with tapered leading edges 234, which are adapted to be engaged by a tapered edge 236 provided on a bolt 238 which is adapted to drop into one of the slots 239 between the teeth 216. The bolt or head 238 is carried by a lever 240 pivotally secured at 241 to a wall of the transmission casing and is resiliently held downwardly by a spring-pressed pin 242 carried by the rod 261 at the rear end thereof. The angle between the leading edge 234 of one tooth 216 and a line normal to the line of thrust through pivot 241 is slightly above the angle of repose or rest for the materials of which the parts are constructed, so that a tendency of the member 214 to rotate in a clockwise direction, looking at Fig. 12, will cam or move the head 238 out of engagement with one of the teeth 216. In other words, the force tending to move the edge 236 of lug or bolt 238 out of engagement with edge 234 of one of the teeth 216 resulting from the torque due to the load of the vehicle is slightly greater than the frictional resistance to separating movement between said edges or faces under the foregoing circumstances. When the shift lever of the transmission is set for neutral or any forward speed position, the spring-pressed pin 242 engages the lever 240 for holding the head 238 thereof in one of the notches 239 and between teeth 216. Movement of the shift lever to reverse position will move the rod 261 for the purpose of bringing the cammed surface 244 of the pin in engagement with the lever 240, whereby the bolt 238 will be moved out of engagement with one of the teeth 216 (by reverse rotation of the member 214 or by spring 248) and held in such position by spring 248 secured at one end to the lever 240 and at the other to the casing of the sprag.

Movement of the shift lever out of reverse position will move the rod 261 so that the cammed surface 244 of the pin will move the head 238 downwardly for engagement with one of the notches 239. The spring 250' is provided behind the pin 242, to permit the head 238 of the lever 240 to jump the slots 239 between the teeth 216 until practically all of the clockwise rotation of the member 214 has been eliminated, when the head 238 will drop into one of the slots 239, and the beveled surface 238 of the head will be in engagement with the tapered leading edge 234 of one of the teeth 216 and will be held in such position by the force of the spring 250' for the purpose of holding the vehicle against rearward movement.

The angle of repose may be defined as follows: If two bodies are in contact with each other and a force is applied to one of said bodies at an angle to a normal to the contacting faces of said bodies, the body to which the force is applied will not move if the tangent of said angle is equal to or less than the coefficient of friction between said surfaces. Therefore, the angle formed by the line of action of the force, wtih the normal to the surfaces, is the angle of repose, if the tangent of that angle is equal to the coefficient of friction of the materials in contact. In the case of a pawl and ratchet mechanism to be designed so that a small force applied to the pawl would hold the pawl in engagement with the wheel, or a small force would separate the pawl from the wheel when under load, it is necessary to locate the pivot point so that the load would tend to force the pawl out of engagement with the wheel, and as follows: Draw a line through the center of pressure and normal to the load holding faces in the direction of the pawl pivot point; then draw a line through said center of pressure and on an angle to said normal and lying between said normal and the center of rotation of said ratchet wheel, the tangent of this angle to be equal of the coefficient of friction of the materials forming the said load-holding faces; then locate the pawl pivot point on this line. The angle thus formed is known as the angle of repose.

If the design is to be such that the load will separate the pawl from the wheel and that only a relatively small force would be necessary to hold the pawl in engagement with the wheel, then the angle above referred to must be slightly greater than the angle of repose; if it is desired to have the pawl stay in engagement when under load and be able to be disengaged by a relatively small force, then the angle above referred to must be equal to or slightly less than the angle of repose.

Of course it is understood that in a practical design, some allowance must be made for the friction of the pawl pivot point in locating said pivot point in respect to said normal. In other words, if it is desired to have the pawl separate from the teeth when under load, and be such that a small force will prevent separation, the angle of the line passing through the pawl pivot center to the normal must be greater than it would be were the pawl pivot center frictionless.

Inasmuch as there is some friction between the teeth, which friction must be overcome when disengaging the same, the angle of the engaging faces would have to be much greater than would be necessary were the contact between the teeth frictionless, or substantially so, in order that the axial component of the torque force be such that a slight force could separate the teeth or hold them in engagement, as the case may be.

This application is a continuation in part of my prior co-pending applications, Serial No. 498,263, filed November 26, 1930, for "Brake," now abandoned, and Serial No. 689,204, filed September 13, 1933, for "Sprag."

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. In the drive system of a motor vehicle, automatic means to prevent undesired retrograde movement of said vehicle, said means including a member provided with lugs, a part adapted to cooperate with said lugs, said lugs and said part having load holding surfaces and faces arranged at an included angle of greater than 90° to the load holding surfaces thereof, said angle being disposed and arranged so that said part cannot drop into full engagement with said lugs while said vehicle is moving backwardly at any appreciable speed but can drop into full engagement with said lugs while said vehicle is moving forwardly at appreciable speed.

2. In the drive system of a motor vehicle, automatic means to prevent undesired retrograde movement of said vehicle, said means including a rotatable member provided with lugs, a part having a portion adapted to be positioned snugly between said lugs so as to prevent rotation of said rotatable member in both directions, said lugs and said portion having load holding surfaces, the ends of said lugs and said portion being arranged at an included angle of greater than 90° to the load holding surfaces thereof, said angle being disposed and arranged so that said portion cannot drop between said lugs so as to prevent rotation of said member while said vehicle is moving backwardly at any appreciable speed, but can drop between said lugs while said vehicle is moving forwardly at appreciable speed.

3. In the drive system of a motor vehicle, automatic means to prevent undesired retrograde movement of said vehicle, said means including a rotatable member provided with lugs, the spaces between said lugs having substantially parallel sides, a part having a portion adapted to be positioned snugly between said lugs so as to prevent rotation of said rotatable member in both directions, said lugs and said portion having load holding surfaces, the ends of said lugs and said portion being arranged at an included angle of greater than 90° to the load holding surfaces thereof, said angle being disposed and arranged so that said portion cannot drop between said lugs so as to prevent rotation of said member while said vehicle is moving backwardly at any appreciable speed, but can drop between said lugs while said vehicle is moving forwardly at appreciable speed.

4. In the drive system of a motor vehicle, automatic means to prevent undesired retrograde movement of said vehicle, said means including a member provided with lugs, a part having a plurality of lugs adapted to cooperate with the lugs of said member, said lugs having load holding surfaces, the load holding faces of said lugs being disposed and arranged so that a line normal to said load holding faces in engagement is at an angle to the line of direction of the force due to the load of the vehicle between said faces.

5. In the drive system of a motor vehicle, a shaft operatively associated with the road wheels thereof, a one-way clutch operatively associated with said shaft, two relatively rotatable members having interengageable means so as to prevent relative rotation between said members, said means having load holding surfaces, at least one of said means having a face arranged at an included angle of greater than 90° to the load holding surface thereof, said members being disposed and arranged so that said face will prevent interengagement during relative rotation at any appreciable speed between said members in the direction in which said one-way clutch drives when it is driven by the motor of the vehicle, so as to prevent shock to said device, but said interengagement will take place upon a reversal of rotation of one member relative to the other, one of said members being driven by said shaft during such time as said first-mentioned relative rotation occurs.

6. In a device for driving a motor vehicle, the combination of a shaft, a driving mechanism adapted to rotate said shaft in opposite directions for driving said vehicle forwardly and rearwardly, control means operable for connecting said driving mechanism to said shaft and for determining the direction of drive of said shaft, means, including disconnectable tooth means associated with said shaft, for locking the same against rotation in one direction to prevent rearward movement of said vehicle whenever said control means are set otherwise than for driving said vehicle rearwardly, means, responsive to the operation of said control means to connect said driving mechanism to said shaft for driving said vehicle rearwardly, to render said locking means inoperative by disconnecting said teeth, means for facilitating the disengagement of said tooth means, so as to permit the vehicle to be driven reversely, when said locking means is subjected to the maximum load of said vehicle while preventing reverse movement thereof, and auxiliary means, operatively associated with said means responsive to the operation of said control means, and operable for maintaining said teeth disconnected until said control means are operated for connecting said shaft to said driving mechanism for driving said vehicle forwardly.

7. In a motor vehicle transmission, a shaft operatively associated with the road wheels of the vehicle, automatic mechanism associated therewith and operable for preventing reverse rotation of said shaft, said mechanism comprising a one-way clutch device having abutments, a pivoted pawl cooperating with said abutments, the contacting faces of said pawl and said abutments being disposed so that a line normal to said contacting faces at the center of pressure will not intersect a line connecting the centers of rotation of both said shaft and said pawl, and resilient means normally holding said pawl in engagement with said abutments.

8. In the drive system of a motor vehicle, a shaft operatively associated with the road wheels of the vehicle, automatic mechanism associated therewith and operable for preventing reverse rotation of said shaft, said mechanism comprising a one-way clutch device having abutments, a pivoted pawl cooperating with said abutments, the pivot center of said pawl being located between a line normal to the load holding faces of said pawl and one of said abutments, and passing through the center of pressure of said faces when in engagement, and the center of rotation of said one-way clutch whereby a line drawn through said pivot center and said center of pressure forms an angle with said normal, enough greater than the angle of repose so that said pawl will be on the verge of remaining in mesh with said abutments under influence of the load of said vehicle.

9. In the drive system of a motor vehicle, a shaft operatively associated with the road wheels of the vehicle, automatic mechanism associated therewith and operable for preventing reverse rotation of said shaft, said mechanism comprising a one-way clutch device having abutments, a pivoted pawl cooperating with said abutments, the pivot center of said pawl being located between a line normal to the load holding faces of said pawl and one of said abutments, and passing through the center of pressure of said faces when in engagement, and the center of rotation of said one-way clutch whereby a line drawn through said pivot center and said center of pressure forms an angle with said normal, enough less than the angle of repose so that the separating component of the load force on said pawl is not quite sufficient to cause separation of the load holding faces of said pawl and abutment.

10. In the drive system of a motor vehicle, a shaft operatively associated with the road wheels of the vehicle, automatic mechanism associated therewith and operable for preventing reverse rotation of said shaft, said mechanism comprising a one-way clutch device having abutments, and a pivoted pawl cooperating with said abutments, the pivot center of said pawl being located between a line normal to the load holding faces of said pawl and one of said abutments and passing through the center of pressure of said faces, when in engagement, and the center of rotation of said one-way clutch, whereby a line drawn through said pivot center and said center of pressure forms an angle with said normal substantially equal to the angle of repose of said pawl and abutments.

11. In the drive system of a motor vehicle, a load holding member, a rotatable member associated with the road wheels of said vehicle, automatic mechanism for preventing rotation of said rotatable member in one direction for preventing retrograde movement of said vehicle, said mechanism comprising a one-way friction clutch having a pair of elements relatively rotatable in one direction only, one of said elements being connected to one of said members, a breakable connection between the other of said elements and the other of said members, said connection comprising tooth means, a part of which tooth means comprise radially extending projections on one of said elements and the other part of said tooth means comprising a complementary projection carried by one of said members, said tooth means being normally engaged, manually operable means for effecting disengagement of said tooth means, and means for facilitating the disengagement of said tooth means so as to permit the vehicle to be driven reversely, when the mechanism is subjected to the maximum load of the vehicle while preventing reverse movement thereof.

12. In the drive system of a motor vehicle, a load holding member, a rotatable member associated with the road wheels of the vehicle, means for selectively driving said vehicle forwardly and reversely, an automatic device comprising a system of mechanisms for preventing rotation of said rotatable member in one direction so as to prevent retrograde movement of said vehicle when said driving means is arranged for driving said vehicle forwardly, said automatic device being operatively associated with said load holding member and said rotatable member and comprising a one-way friction clutch having a pair of elements relatively rotatable in one direction only, one of said elements being connected to one of said members, a breakable connection between the other of said elements and the other of said members, said connection comprising a pivoted tooth means and radially extending tooth means carried by one of said elements, said tooth means normally being engageable, manually operable means for effecting the disengagement of said tooth means, and means for facilitating the disengagement of said tooth means so as to permit the vehicle to be driven reversely, when the mechanism is subjected to the maximum load of the vehicle while preventing reverse movement thereof.

13. In the drive system of a motor vehicle, a shaft operatively connected to the road wheels of the vehicle, a one-way clutch operatively associated with said shaft, means for driving said shaft selectively in both directions, a rotatably mounted member concentric with said shaft and rotatable in at least one direction relative thereto, said member being provided with a slot, a bolt mounted for substantially reciprocal movement and adapted to project into said slot so as to prevent rotation of said member relative to said bolt in either direction, the end of said bolt being tapered so as to prevent the projection thereof into said slot when said member is rotating relative to said bolt at any appreciable speed in the direction in which said one-way clutch drives when it is driven by the motor of the vehicle, and a driver controlled device for controlling said bolt.

14. In the drive system of a motor vehicle, a transmission having a shaft operatively connected to the road wheels of the vehicle, means for arranging said transmission for driving said shaft selectively in either direction, a rotatably mounted member concentric with said shaft and rotatable in at least one direction relative thereto, said member being provided with a slot, a substantially radially movable bolt adapted to project into said slot so as to prevent rotation of said member relative to said bolt in either direction, said bolt and said slot having load holding faces, the end of said bolt being tapered and arranged at an included angle of greater than 90° to the load holding face thereof, and a driver controlled device for controlling said bolt.

15. In the drive system of a motor vehicle including a shaft operatively associated with the road wheels thereof, means for selectively driving said shaft forwardly and reversely, a pair of relatively rotatable members, one of said members being provided with a slot and the other of said members including a substantially reciprocable bolt, one of said members being operatively associated with said shaft so as to rotate therewith, said bolt being adapted to project into said slot for preventing relative rotation between said members, and means for preventing the projection of said bolt into said slot during one direction of relative rotation between said members and until any substantial relative rotation in said one direction therebetween is eliminated, said means comprising a beveled face on one of said members which cooperates with the other of said members to prevent the projection of said bolt into said slot until said relative rotation in one direction therebetween has been substantially eliminated, said shaft being operatively associated with said driving means in such a manner that said shaft may be driven in both directions when said bolt is not projected into said slot.

16. In the drive system of a motor vehicle including a shaft connected with the road wheels so as to rotate therewith in both directions of rotation thereof, means for selectively motor driving said shaft in either direction, a rotatable member provided with slots, said member and said road wheels being connected to said shaft in such a manner that both may be driven by said shaft at the same time, a substantially radially movable lug member capable of engagement with one of said slots so as to prevent relative rotation between said members in both directions, one of said members having a beveled face which cooperates with the other of said members to prevent the engagement of said lug member in one of said slots when said rotatable member and shaft are rotating in one direction at any appreciable speed relative to said lug member, means for mounting said lug member so that when it is in engagement with one of said slots it is capable of taking the torque reaction of said shaft and said road wheels on said rotatable member in said one direction, and means for connecting said rotatable member provided with slots to said shaft in such a manner that said shaft may be motor driven in at least one direction when said lug member is in engagement with one of said slots preventing relative rotation between said members.

17. In the drive system of a motor vehicle including a shaft connected with the road wheels so as to rotate therewith in both directions of rotation thereof, means for selectively motor driving said shaft in either direction, a rotatable member provided with slots, said member and said road wheels being connected to said shaft in such a manner that both may be driven by said shaft at the same time, a movable lug member capable of engagement with one of said slots so as to prevent relative rotation between said members in both directions, one of said members having a beveled face which cooperates with the other of said members to prevent the engagement of said lug member in one of said slots when said rotatable member and shaft are rotating in one direction at any appreciable speed relative to said lug member, and means for mounting said lug member so that upon elimination of said relative rotation it will move into engagement with one of said slots and be capable of taking the torque reaction of said shaft and said road wheels on said rotatable member in said one direction, said shaft and said road wheels being operatively associated with said driving means so that said shaft and said road wheels may be driven in a direction to drive the vehicle rearwardly when said lug member is not in engagement with one of said slots.

18. In the drive system of a motor vehicle including a shaft connected with the road wheels so as to rotate therewith in both directions of rotation thereof, means for selectively motor driving said shaft in either direction, a rotatable member provided with slots, said member and said road wheels being connected to said shaft in such a manner that both may be driven by said shaft at the same time in at least one direction, a lug member, non-rotatable relative to the axis of rotation of said rotatable member, capable of engagement with one of said slots so as to prevent relative rotation between said members in both directions, one of said members having a beveled face which cooperates with the other of said members to prevent the engagement of said lug member in one of said slots when said rotatable member and shaft are rotating in said one direction at any appreciable speed relative to said lug member, and means for mounting said lug member so that upon elimination of said relative rotation it will move into engagement with one of said slots and be capable of taking the torque reaction of said shaft and said road wheels on said rotatable member in said one direction.

19. In the drive system of a motor vehicle including a motor driven shaft connected with the road wheels so as to rotate therewith, a rotatable member provided with slots, said member and said road wheels being connected to said shaft in such a manner that both may be driven by said shaft at the same time in at least one direction, a lug member, non-rotatably mounted relative to the axis of rotation of said rotatable member, capable of engagement with one of said slots so as to prevent relative rotation between said members, one of said members having a beveled face which cooperates with the other of said members to prevent the engagement of said lug member in one of said slots when said rotatable member and shaft are rotating in the same direction at any appreciable speed relative to said lug member and the road wheels are being driven, and means for mounting said lug member so that upon elimination of said relative rotation it will move into engagement with one of said slots and be capable of taking the torque reaction of said shaft and said road wheels on said rotatable member in said one direction.

20. In the drive system of a motor vehicle including a motor driven shaft operatively associated with the road wheels thereof, a rotatable member provided with slots and arranged concentric with said shaft, said member and said road wheels being connected to said shaft in such a manner that both may be driven at the same time by said shaft upon rotation thereof in one direction, said member being driven by said shaft in said one direction, a substantially radially movable lug member capable of engagement with one of said slots so as to prevent relative rotation between said members in both directions, one of said members having a beveled face which cooperates with the other of said members to prevent the engagement of said lug member in one of said slots when said rotatable member is rotating relative thereto at any appreciable speed in said one direction and means for connecting said rotatable member provided with slots to said shaft in such a manner that said shaft may be motor driven in at least one direction when said lug member is in engagement with one of said slots preventing relative rotation between said members.

21. In the drive system of a motor vehicle including a motor driven shaft operatively associated with the road wheels thereof, means for selectively motor driving said shaft in either direction, a rotatable member provided with slots and arranged concentric with said shaft, said member and said road wheels being connected to said shaft in such a manner that both may be driven at the same time by said shaft upon rotation thereof in one direction, said member being driven by said shaft in said one direction, a movable lug member capable of engagement with one of said slots so as to prevent relative rotation between said members in both directions, one of said members having a beveled face which always faces in a direction in which it will cooperate with the other of said members to prevent the engagement of said lug member in one of said slots when said rotatable member is rotating relative thereto at any appreciable speed in said one direction and under conditions which would cause harmful shock to the drive system of the vehicle, said shaft and road wheels being operatively associated with said driving means so that said shaft and road wheels may be driven in a direction to drive the vehicle rearwardly when said lug member is not in engagement with one of said slots.

22. In the drive system of a motor vehicle, a transmission having a motor driven shaft operatively associated with the road wheels thereof, means for selectively arranging said transmission for driving said shaft in either direction for driving the vehicle forwardly or reversely, a rotatably mounted member concentric with said shaft and provided with a slot, a bolt member mounted for substantially reciprocal movement and adapted to project into said slot so as to prevent relative rotation between said members, means for preventing the projection of said bolt member into said slot during one direction of relative rotation between said members and until any substantial relative rotation therebetween in said one direction is eliminated, and means for preventing the projection of said bolt into said slot when said transmission is arranged for driving the vehicle reversely.

23. In the drive system of a motor vehicle, a transmission having a motor driven shaft operatively associated with the road wheels thereof, means for selectively arranging said transmission for driving said shaft in either direction for driving the vehicle forwardly or reversely, a rotatably mounted member concentric with said shaft and provided with a slot, a bolt member mounted for substantially reciprocal movement and adapted to project into said slot so as to prevent relative rotation between said members, means for preventing the projection of said bolt member into said slot during one direction of relative rotation between said members and until any substantial relative rotation therebetween in said one direction is eliminated, and means associated with said transmission arranging means so as to be operated thereby upon arranging said transmission for driving said vehicle reversely for preventing the projection of said bolt member into said slot.

24. In combination with a motor vehicle power transmission having a shaft operatively associated with the road wheels of the vehicle, mechanism associated with said shaft and automatically operable for resisting the load of said vehicle tending to rotate said shaft in one direction, shift means operable incidental to setting said transmission for driving said vehicle in one direction for rendering said mechanism inoperative, said shift means and said mechanism having cooperative and separable teeth so designed that they are readily disengageable when said mechanism is holding said shaft under conditions of maximum load against rotation for preventing the locking of said shift means, said teeth having load holding surfaces which are arranged so that a line normal thereto is at an angle to the line of direction of the force between said surfaces.

25. Reverse brake construction for a motor vehicle driving mechanism comprising a fixed member, a rotatable member, automatic mechanism for preventing rotation of said member in one direction, said mechanism comprising a one-way device having a pair of elements relatively rotatable in one direction only, one of said elements being fixed to one of said members, and a disconnectable connection between the other of said elements and the other of said members, said connection comprising tooth means designed to prevent meshing together while any substantial relative movement exists therebetween in said one direction only and to readily permit disengagement thereof when said mechanism is employed in resisting a maximum load tending to rotate said rotatable member in said one direction, said tooth means having load holding surfaces, said last-mentioned means including a beveled end on at least one of said teeth sloping away from the load holding surface thereof, and manually operable means for operating said connection.

26. In a device of the class described, a system of mechanisms including a load holding member, a rotatable member, automatic mechanism for preventing rotation of said member in one direction, said automatic mechanism comprising a one-way device having a pair of elements relatively rotatable in one direction only, one of said elements being fixed to one of said members, and a disconnectable connection between the other of said elements and the other of said members, said connection comprising tooth means having load holding surfaces in engagement, the line of direction of the force between said surfaces being at an angle to a line normal to said surfaces in engagement, said angle approximating the angle of rest of said system of mechanisms.

27. In a device of the class described, a system of mechanisms including a load holding member, a rotatable member, automatic mechanism for preventing rotation of said member in one direction, said automatic mechanism comprising a one-way device having a pair of elements relatively rotatable in one direction only, one of said elements being fixed to one of said members, and a disconnectable connection between the other of said elements and the other of said members, said connection comprising tooth means having load holding surfaces in engagement, the line of direction of the force between said surfaces being at an angle to a line normal to said surfaces in engagement, said angle being slightly less than the angle of rest of said system of mechanisms and resilient means urging said tooth means into meshing engagement.

28. In a device of the class described, a system of mechanisms including a load holding member, a rotatable member, automatic mechanism for preventing rotation of said member in one direction, said automatic mechanism comprising a one-way device having a pair of elements relatively rotatable in one direction only, one of said elements being fixed to one of said members, and a disconnectable connection between the other of said elements and the other of said members, said connection comprising tooth means having load holding surfaces in engagement, the line of direction of the force between said surfaces being at an angle to a line normal to said surfaces in engagement, said angle being slightly greater than the angle of rest of said system of mechanisms, and resilient means operable for holding said tooth means in meshing engagement.

29. In combination with a motor vehicle transmission, a system of mechanisms including a load holding member, a rotatable member, automatic mechanism for preventing rotation of said member in one direction, said automatic mechanism comprising a one-way device having a pair of elements relatively rotatable in one direction only, one of said elements being fixed to one of said members, a disconnectable connection between the other of said elements and the other of said members, said connection comprising tooth means having load holding surfaces in engagement, the line of direction of the force between said surfaces being at an angle to a line normal to said surfaces in engagement, said angle being such that the force tending to cause separation of said tooth means is approximately equal to the purchase between the teeth due to the friction of the system, and spring means normally holding said tooth means in operative engagement.

30. In combination with a motor vehicle transmission, a system of mechanisms including a load holding member, a rotatable member operatively associated with the road wheels of the vehicle, automatic mechanism for preventing rotation of said member in one direction, said automatic mechanism comprising a one-way device having a pair of elements relatively rotatable in one direction only, one of said elements being fixed to one of said members, a disconnectable connection between the other of said elements and the other of said members, said connection comprising tooth means having load holding surfaces in engagement, the line of direction of the force between said surfaces being at an angle to a line normal to said surfaces in engagement, said angle approximating the angle of rest of said system of mechanisms, and resilient means constraining said tooth means into meshing engagement.

31. In the drive system of a motor vehicle, a load holding member, a rotatable member associated with the road wheels of said vehicle, automatic mechanism for preventing rotation of said rotatable member in one direction for preventing retrograde movement of said vehicle, said mechanism comprising a one-way device having a pair of elements relatively rotatable in one direction only, one of said elements being connected to one of said members, a breakable connection between the other of said elements and the other of said members, said connection comprising tooth means designed to prevent meshing together while any substantial relative movement exists therebetween due to retrograde movement of said vehicle, spring means acting on said tooth means for resiliently urging the same into meshing engagement, said spring means and the shape of said tooth means forming the sole means for preventing said tooth means from separating when said mechanism is under the maximum load of the vehicle, and manually operable means for overcoming the action of said spring means and thereby effecting the disengagement of said tooth means.

32. In the drive system of a motor vehicle, a load holding member, a rotatable member associated with the road wheels of said vehicle, automatic mechanism for preventing rotation of said rotatable member in one direction for preventing retrograde movement of said vehicle, said mechanism comprising a one-way device having a pair of elements relatively rotatable in one direction only, one of said elements being connected to one of said members, a breakable connection between the other of said elements and the other of said members, said connection comprising tooth means designed to prevent meshing together while any substantial relative movement exists therebetween due to retrograde movement of said vehicle, spring means acting on said tooth means for resiliently urging the same into meshing engagement, manually operable means for overcoming the action of said spring means and thereby effecting the disengagement of said tooth means, and means to facilitate the disengagement of said tooth means by said manually operable means when said mechanism is resisting the maximum load of said vehicle tending to rotate said rotatable member in said one direction.

33. In the drive system of a motor vehicle, a shaft operatively associated with the road wheels of the vehicle, means for selectively driving said vehicle forwardly and reversely, an overrunning mechanism associated with said shaft and automatically operable for preventing reverse movement of said vehicle when said driving means is arranged for driving the vehicle forwardly, lug means associated with said mechanism and being disengageable for rendering said overrunning mechanism inoperative, a shifting device for disengaging said lug means, and means for facilitating the disengagement of said lug means, so as to permit the vehicle to be driven reversely, when said mechanism is subjected to the maximum load of said vehicle while preventing the reverse movement thereof.

34. In the drive system of a motor vehicle, a shaft operatively associated with the road wheels of the vehicle, means for selectively driving said vehicle forwardly and reversely, an overrunning mechanism associated with said shaft and automatically operable for preventing reverse movement of said vehicle when said driving means is arranged for driving the vehicle forwardly, lug means associated with said mechanism and being disengageable for rendering said overrunning mechanism inoperative, a shifting device for disengaging said lug means, means for facilitating the disengagement of said lug means, so as to permit the vehicle to be driven reversely, when said mechanism is subjected to the maximum load of said vehicle while preventing the reverse movement thereof, said lug means being designed to prevent meshing together while any substantial relative movement exists therebetween due to reverse movement of said vehicle, and spring means resiliently urging the same into meshing engagement.

35. In the drive system of a motor vehicle, a load holding member, a rotatable member associated with the road wheels of the vehicle, means for selectively driving said vehicle forwardly and reversely, an automatic device comprising a system of mechanisms for preventing rotation of said rotatable member in one direction so as to prevent retrograde movement of said vehicle when said driving means is arranged for driving said vehicle forwardly, said automatic device being located between said load holding member and said rotatable member and comprising a one-way device having a pair of elements relatively rotatable in one direction only, one of said elements being connected to one of said members, a breakable connection between the other of said elements and the other said members, said connection comprising tooth means having load holding surfaces in engagement, the line of direction of the force between said surfaces being at an angle to a line normal to said surfaces in engagement, spring means acting on said tooth means for resiliently urging the same into meshing engagement, said angle being such that said tooth means will be on the verge of separating under influence of the load of the vehicle.

36. In the drive system of a motor vehicle, a load holding member, a rotatable member associated with the road wheels of the vehicle, means for selectively driving said vehicle forwardly and reversely, an automatic device comprising a system of mechanisms for preventing rotation of said rotatable member in one direction so as to prevent retrograde movement of said vehicle when said driving means is arranged for driving said vehicle forwardly, said automatic device being located between said load holding member and said rotatable member and comprising a one-way device having a pair of elements relatively rotatable in one direction only, one of said elements being connected to one of said members, a breakable connection between the other of said elements and the other of said members, said connection comprising tooth means having load holding surfaces in engagement, the line of direction of the force between said surfaces being at an angle to a line normal to said surfaces in engagement, spring means acting on said tooth means for resiliently urging the same into meshing engagement, said angle being such that said tooth means will be on the verge of separating under influence of the load of the vehicle, said tooth means being designed to prevent meshing together during any substantial relative movement thereof due to retrograde movement of said vehicle.

37. In the drive system of a motor vehicle, a load holding member, a rotatable member associated with the road wheels of the vehicle, means for selectively driving said vehicle forwardly and reversely, an automatic device comprising a system of mechanisms for preventing rotation of said rotatable member in one direction so as to prevent retrograde movement of said vehicle when said driving means is arranged for driving said vehicle forwardly, said automatic device being located between said load holding member and said rotatable member and comprising a one-way device having a pair of elements relatively rotatable in one direction only, one of said elements being connected to one of said members, a breakable connection between the other of said elements and the other of said members, said connection comprising tooth means having load holding surfaces in engagement, the line of direction of the force between said surfaces being at an angle to a line normal to said surfaces in engagement, said angle being such that the force tending to cause separation of said tooth means is approximately equal to the purchase between the teeth due to the friction of the system, and spring means acting on said tooth means for resiliently urging the same into meshing engagement.

38. In the drive system of a motor vehicle, a load holding member, a rotatable member associated with the road wheels of the vehicle, an automatic device comprising a system of mechanisms for preventing rotation of said rotatable member in one direction so as to prevent retrograde movement of said vehicle, said automatic device being located between said load holding member and said rotatable member and comprising a one-way device having a pair of elements relatively rotatable in one direction only, one of said elements being connected with one of said members, a breakable connection between the other of said elements and the other of said members, said connection comprising lug means having load holding surfaces in engagement, the line of direction of the force between said surfaces being at an angle to a line normal to said surfaces in engagement, said angle being such that the force on the movable element of said connection resulting from the torque on said lug means due to the load of the vehicle will approximate the frictional resistance to movement of said movable element set up by the torque between one of said elements and one of said members due to the load of said vehicle.

39. In the drive system of a motor vehicle, a load holding member, a rotatable member associated with the road wheels of the vehicle, means for selectively driving said vehicle forwardly and reversely, an automatic device comprising a system of mechanisms for preventing rotation of said rotatable member in one direction so as to prevent retrograde movement of said vehicle when said driving means is arranged for driving said vehicle forwardly, said automatic device being located between said load holding member and said rotatable member and comprising a one-way device having a pair of elements relatively rotatable in one direction only, one of said elements being connected to one of said members, a breakable connection between the other of said elements and the other of said members, said connection comprising radially projecting tooth means having load holding surfaces normally in engagement, the line of direction of the force between said surfaces being at an angle to a line normal to said surfaces in engagement, said tooth means being urged into meshing engagement, said angle being such that said tooth means will be on the verge of separating under influence of the load of the vehicle.

40. In combination with a motor vehicle transmission, a system of mechanisms including a load holding member, a rotatable member operatively associated with the road wheels of the vehicle, automatic mechanism for preventing rotation of said member in one direction, said automatic mechanism comprising a one-way device having a pair of elements relatively rotatable in one direction only, one of said elements being fixed to one of said members, a disconnectable connection between the other of said elements and the other of said members, said connection comprising radially projecting normally engaged tooth means having load holding surfaces normally in engagement, the line of direction of the force between said surfaces being at an angle to a line normal to said surfaces in engagement, said angle approximating the angle of rest of said system of mechanisms.

41. In the drive system of a motor vehicle, a shaft operatively associated with the road wheels of the vehicle, means for selectively driving said vehicle forwardly and reversely, an overrunning mechanism associated with said shaft and automatically operable for preventing reverse movement of said vehicle when said driving means is arranged for driving the vehicle forwardly, radially projecting normally engaged lug means associated with said mechanism and being disengageable for rendering said overrunning mechanism inoperative, a shifting device for disengaging said lug means, and means for facilitating the disengagement of said lug means, so as to permit the vehicle to be driven reversely, when said mechanism is subjected to the maximum load of said vehicle while preventing the reverse movement thereof.

42. In the drive system of a motor vehicle, a load holding member, a rotatable member associated with the road wheels of the vehicle, an automatic device comprising a system of mechanisms for preventing rotation of said rotatable member in one direction so as to prevent retrograde movement of said vehicle, said automatic device being located between said load holding member and said rotatable member and comprising a one-way device having a pair of elements relatively rotatable in one direction only, one of said elements being connected with one of said members, a breakable connection between the other of said elements and the other of said members, said connection comprising radially projecting lug means having load holding surfaces normally in engagement, the line of direction of the force between said surfaces being at an angle to a line normal to said surfaces in engagement, said angle being such that the force on the movable element of said connection resulting from the torque on said lug means due to the load of the vehicle will approximate the frictional resistance to movement of said movable element set up by the torque between one of said elements and one of said members due to the load of said vehicle.

43. In the drive system of a motor vehicle having a motor and road drive wheels, a power driven shaft operatively connected to the road wheels of said vehicle, an annular member concentric with said shaft and rotatable in at least one direction relative thereto, said member being provided with a radially extending slot, a movable lug non-rotatably mounted relative to the axis of rotation of said member, said lug and said member being relatively rotatable, said lug being adapted to project into said slot so as to prevent relative rotation between said lug and said member in both directions, said lug and said member having load holding faces which are interengaged when said lug is in said slot holding said annular member against rotation in said one direction relative to said lug, means including said shaft connecting the motor of the vehicle to said annular member and to said drive wheels for driving the same in said one direction, when said lug is not in said slot, the end of said lug being tapered and cooperating with the walls of said slot so as to prevent the projection of said lug into said slot and the interengagement of said load holding faces until relative rotation in said one direction between said lug and said member is substantially eliminated.

44. In the drive system of a motor vehicle, a shaft operatively connected to the road wheels of the vehicle, means for selectively driving said shaft forwardly and reversely, a rotatably mounted member concentric with said shaft, said member being provided with slots, a relatively movable lug adapted to project into one of said slots, so as to prevent rotation of said member relative to said lug in both directions, said lug and slots having load holding faces, means to prevent the projection of said lug into any one of said slots and the engagement of said load holding faces during rotation of said member in one direction relative to said lug and under conditions which would cause harmful shock to the drive system of said vehicle, the end of said lug being tapered so as to facilitate the projection of said lug into one of said slots upon rotation of said member in the other direction relative to said lug, and a driver controlled device for controlling said lug, said shaft being operatively associated with said driving means so that said shaft may be driven in a direction to drive the vehicle reversely when said lug is not projecting into one of said slots of said member.

45. In the drive system of a motor vehicle, a shaft operatively associated with the road wheels thereof, a one-way clutch operatively associated with said shaft, two relatively rotatable members having interengageable means so as to prevent relative rotation between said members, said members having associated therewith means to prevent interengagement during relative rotation between said members in the direction in which said one-way clutch drives when driven by the motor of the vehicle so as to prevent harmful shock to said device, said interengageable means being provided with load holding surfaces, at least one of said means having a face arranged at an included angle of greater than 90° to the load holding surface thereof so as to facilitate interengagement of said interengageable means upon rotation in the opposite direction of one member relative to the other, one of said members being driven by said shaft during such time as said first-mentioned relative rotation occurs.

46. In the drive system of a motor vehicle, a power driven shaft operatively connected to the road wheels of said vehicle, means for selectively driving said shaft and vehicle forwardly and reversely, an annular member concentric with said shaft and rotatable in at least one direction relative thereto, said member being provided with a radially extending slot, a movable lug non-rotatably mounted relative to the axis of said member, means drivingly connecting the motor of the vehicle to said rotatable member and to said drive wheels for driving the same in said one direction, when said lug is not in said slot, said lug and said member having load holding faces and being relatively rotatable, said lug being adapted to project into said slot and being mounted in such a manner so as to prevent relative rotation between said lug and said member in both directions, the end of said lug being tapered and cooperating with the walls of said slot so as to facilitate the projection of said lug into said slot and the interengagement of said load holding faces upon relative rotation in one direction between said lug and said member.

47. In the drive system of a motor vehicle, a shaft operatively connected to the road wheels of the vehicle, a one-way clutch operatively associated with said shaft, means for driving said shaft selectively in both directions, a rotatably mounted member concentric with said shaft and rotatable in at least one direction relative thereto, said member being provided with a slot, a bolt mounted for substantially reciprocal movement and adapted to project into said slot so as to prevent rotation of said member relative to said bolt in both directions, means to prevent the projection of said bolt into said slot when said member is rotating relative to said bolt at any appreciable speed in the direction in which said one-way clutch drives when driven by the motor of the vehicle, the end of said bolt being tapered so as to facilitate the projection of said bolt into said slot when said member rotates in the opposite direction relative to said bolt, and a driver controlled device for controlling said bolt.

48. In the drive system of a motor vehicle including a shaft connected with the road wheels so as to rotate therewith in both directions of rotation thereof, means for selectively driving said shaft in either direction, a rotatable member provided with slots, said member and said road wheels being connected to said shaft in such a manner that both may be driven by said shaft at the same time, a substantially radially movable lug member capable of engagement with one of said slots so as to prevent relative rotation between said members in both directions, means to prevent the engagement of said lug member in one of said slots when said rotatable member and shaft are rotating in one direction at any appreciable speed relative to said lug member, one of said members having a beveled face which cooperates with the other of said members to facilitate engagement of said lug member with one of said slots when said rotatable member is rotating in the opposite direction relative to said lug member, and means for mounting said lug member so that when it is in engagement with one of said slots it is capable of taking the torque reaction of said shaft and said road wheels on said rotatable member in said one direction.

49. In the drive system of a motor vehicle including a shaft connected with the road wheels so as to rotate therewith in both directions of rotation thereof, means for selectively driving said shaft in either direction, a rotatable member provided with slots, said member and said road wheels being connected to said shaft in such a manner that both may be driven by said shaft at the same time, a movable lug member capable of engagement with one of said slots so as to prevent relative rotation between said members in both directions, means to prevent the engagement of said lug member in one of said slots when said rotatable member and shaft are rotating in one direction at any appreciable speed relative to said lug member, means for mounting said lug member so that upon reversal of said relative rotation it will move into engagement with one of said slots and be capable of taking the torque reaction of said shaft and said road wheels on said rotatable member in said one direction, one of said members having a beveled face which cooperates with the other of said members to facilitate engagement of said lug member with one of said slots when said rotatable member is rotating in the opposite direction relative to said lug member, said shaft being operatively associated with said driving means so that said shaft may be selectively driven in a direction to drive the vehicle rearwardly when said lug member is not in engagement with one of said slots.

50. In the drive system of a motor vehicle including a shaft connected with the road wheels so as to rotate therewith in both directions of rotation thereof, means for selectively driving said shaft in either direction, a rotatable member provided with slots, said member and said road wheels being connected to said shaft in such a manner that both may be driven by said shaft at the same time in at least one direction, a lug member, non-rotatable relative to the axis of rotation of said rotatable member, capable of engagement with one of said slots so as to prevent relative rotation between said members in both directions, means to prevent the engagement of said lug member in one of said slots when said rotatable member and shaft are rotating in said one direction at any appreciable speed relative to said lug member, and means for mounting said lug member so that upon reversal of said relative rotation it will move into engagement with one of said slots and be capable of taking the torque reaction of said shaft and said road wheels on said rotatable member in said one direction, one of said members having a beveled face which cooperates with the other of said members to facilitate engagement of said lug member with one of said slots when said rotatable member is rotating in the opposite direction relative to said lug member.

51. In the drive system of a motor vehicle including a power driven shaft connected with the road wheels so as to rotate therewith, a rotatable member provided with slots, said member and said road wheels being connected to said shaft in such a manner that both may be driven by said shaft at the same time in at least one direction, a lug member, non-rotatably mounted relative to the axis of rotation of said rotatable member, capable of engagement with one of said slots so as to prevent relative rotation between said members in both directions, means to prevent the engagement of said lug member in one of said slots when said rotatable member and shaft are rotating in the same direction at any appreciable speed relative to said lug member and the road wheels are being driven, and means for mounting said lug member so that upon reversal of said relative rotation it will move into engagement with one of said slots and be capable of taking the torque reaction of said shaft and said road wheels on said rotatable member in said one direction, one of said members having a beveled face which cooperates with the other of said members to facilitate engagement of said lug member with one of said slots when said rotatable member is rotating in the opposite direction relative to said lug member.

52. In the drive system of a motor vehicle including a power driven shaft operatively associated with the road wheels thereof, a rotatable member provided with slots and arranged concentric with said shaft, said member and said road wheels being connected to said shaft in such a manner that both may be driven at the same time by said shaft upon rotation thereof in one direction, said member being driven by said shaft in said one direction, a substantially radially movable lug member capable of engagement with one of said slots so as to prevent relative rotation between said members in both directions, means to prevent the engagement of said lug member in one of said slots when said rotatable member is rotating relative thereto at any appreciable speed in said one direction, one of said members having a beveled face which cooperates with the other of said members to facilitate engagement of said lug member with one of said slots when said rotatable member is rotating in the opposite direction relative to said lug member.

53. In the drive system of a motor vehicle including a power driven shaft operatively associated with the road wheels thereof, a rotatable member provided with slots and arranged concentric with said shaft, said member and said road wheels being connected to said shaft in such a manner that both may be driven at the same time by said shaft upon rotation thereof in one direction, said member being driven by said shaft in said one direction, a movable lug member capable of engagement with one of said slots so as to prevent relative rotation between said members in both directions, means to prevent the engagement of said lug member in one of said slots when said rotatable member is rotating relative thereto at any appreciable speed in said one direction and under conditions which would cause harmful shock to the drive system of the vehicle, one of said members having a beveled face which cooperates with the other of said members to facilitate engagement of said lug member with one of said slots when said rotatable member is rotating in the opposite direction relative to said lug member, said shaft being associated with the road wheels so that the same may be driven in a direction to drive the vehicle rearwardly when said lug member is not in engagement with one of said slots.

54. In the drive system of a motor vehicle having road wheels, a shaft operatively associated with the road wheels of the vehicle so as to rotate therewith, a motor, means for motor driving said shaft and said road wheels in at least one direction, a slotted member operatively associated with said driving means and connected with said shaft so that said slotted member and said shaft may be driven in said one direction at the same time by said driving means, a lug member adapted to engage one of the slots of said slotted member so as to prevent rotation of said slotted member relative to said lug member in both directions, said lug member being also disengageable from said slot, said shaft being associated with the road wheels so that the same may be driven in a direction to drive the vehicle rearwardly when said lug member is not in engagement with one of said slots, means operative to prevent engagement of said lug member in one of said slots when said slotted member is rotating in said one direction at any appreciable speed relative to said lug member and when the shaft and the road wheels are moving in said one direction after having been motor-driven in said one direction, one of said members having a beveled face which cooperates with the other of said members to facilitate engagement of said lug member in one of said slots upon reversal of said relative rotation between said members, and means for mounting said lug member so that upon said reversal of relative rotation it will move into engagement with one of said slots.

55. In the drive system of a motor vehicle having road wheels, a shaft operatively associated with the road wheels of the vehicle so as to rotate therewith, a motor, means for motor driving the road wheels in at least one direction, a slotted member operatively associated with said driving means and connected with said shaft so that said slotted member and said road wheels may be driven in said one direction at the same time by said driving means, a substantially radially movable lug member adapted to intimately engage one of the slots of said slotted member so as to prevent rotation of said slotted member relative to said lug member in both directions, means for disengaging said lug member from said slot, other means operative to prevent engagement of said lug member and one of said slots after said disengaging means ceases to function and when said slotted member is rotating in said one direction at any appreciable speed relative to said lug member and when the road wheels are moving in said one direction after having been motor-driven in said one direction, said other means being constructed and arranged so that the lug member will engage one of said slots upon a reversal of rotation of said slotted member relative to said lug member, and means for facilitating the engagement of said lug member with said slot upon said reversal of relative rotation between said members.

56. In the drive system of a motor vehicle having road wheels, a shaft operatively associated with the road wheels of the vehicle so as to rotate therewith, a motor, means for motor driving said shaft and said road wheels in at least one direction, a slotted member operatively associated with said driving means and connected with said shaft so that said slotted member and said shaft may be driven in said one direction at the same time by said driving means, a substantially radially movable lug member adapted to engage one of the slots of said slotted member so as to prevent rotation of said slotted member relative to said lug member in both directions, said lug member being also disengageable from said slot, means operative to prevent engagement of said lug member in one of said slots when said slotted member is rotating in said one direction at any appreciable speed relative to said lug member and when the shaft and the road wheels are moving in said one direction after having been motor-driven in said one direction, one of said members having a beveled face which cooperates with the other of said members to facilitate engagement of said lug member in one of said slots upon reversal of said relative rotation between said members, and means for mounting said lug member so that upon said reversal of relative rotation it will move into engagement with one of said slots.

57. In the drive system of a motor vehicle having road wheels, a shaft operatively associated with the road wheels of the vehicle so as to rotate therewith, a motor, means for motor driving said shaft and said road wheels in at least one direction, a toothed member operatively associated with said driving means and connected with said shaft so that said toothed member and said shaft may be driven in said one direction at the same time by said driving means, lug means adapted to engage said toothed member so as to prevent rotation of said toothed member relative to said lug means in both directions, said lug means being also disengageable from said toothed member, said shaft being associated with the road wheels so that the same may be driven in a direction to drive the vehicle rearwardly when said lug means is not in engagement with said toothed member, an element directly engageable with said lug means and operative to prevent engagement of said lug means and said toothed member when it is rotating in said one direction relative to said lug means and when the shaft and the road wheels are moving in said one direction after having been motor-driven in said one direction, means to facilitate engagement of said lug means and said toothed member after said element ceases to function, and means for mounting said lug means so that when said element ceases to function said lug means will engage said toothed member.

58. In the drive system of a motor vehicle having road wheels, a shaft operatively associated with the road wheels of the vehicle so as to rotate therewith, a motor, means for motor driving said shaft and said road wheels in at least one direction, a toothed member operatively associated with said driving means and connected with said shaft so that said toothed member and said shaft may be driven in said one direction at the same time by said driving means, radially movable lug means adapted to engage said toothed member so as to prevent rotation of said toothed member relative to said lug means in both directions, said lug means being also disengageable from said toothed member, said shaft being associated with the road wheels so that the same may be driven in a direction to drive the vehicle rearwardly when said lug means is not in engagement with said toothed member, an element directly engageable with said lug means and operative to prevent engagement of said lug means and said toothed member when it is rotating in said one direction relative to said lug means and when the shaft and the road wheels are moving in said one direction after having been motor-driven in said one direction, means to facilitate engagement of said lug means and said toothed member when said element ceases to function, and means for mounting said lug means so that when said element ceases to function said lug means will engage said toothed member.

59. In the drive system of a motor vehicle having a motor and road drive wheels, and a shaft operatively associated with said motor and said road wheels, means for motor driving said vehicle in a forward and reverse direction, a slotted member concentric with said shaft, said slotted member, said shaft and said road wheels being adapted to be driven by said motor at the same time when said vehicle is driven in one of said directions, a substantially radially movable lug member adapted to intimately engage one of the slots of said slotted member so as to prevent rotation of said slotted member relative to said lug member in both directions, said slotted member having means associated therewith and operative during rotation of said slotted member relative to said lug member to prevent engagement of said lug member and one of said slots under any condition that would cause harmful shock to the drive system of said vehicle, said slotted member being associated with said shaft in such a manner that said shaft may be driven in at least one direction when said lug member is in engagement with one of said slots preventing relative rotation between said members, and means for facilitating the engagement of said lug member and one of said slots when said means ceases to function.

60. In the drive system of a motor vehicle having a transmission with a manual shifting device operable for arranging the transmission for driving the vehicle forwardly and reversely, a load holding member, a rotatable member associated with the road wheels of said vehicle, automatic mechanism for preventing rotation of said rotatable member in one direction for preventing retrograde movement of said vehicle, said mechanism comprising a one-way friction clutch having a pair of elements relatively rotatable in one direction only, one of said elements being connected to one of said members, a breakable connection between the other of said elements and the other of said members, said connection comprising tooth means, a part of which tooth means comprise radially extending projections on one of said elements and the other of said tooth means comprising a complementary projection carried by one of said members, said tooth means being normally engaged, manually operable means for effecting disengagement of said tooth means, and means for facilitating the disengagement of said tooth means, so that the force which must be exerted on said manually operable means to disengage said tooth means, when the mechanism is subjected to the maximum load of the vehicle while preventing reverse movement thereof, is approximately of the same order as that force required to operate said manual shifting device for arranging the transmission for driving the vehicle reversely.

61. In the drive system of a motor vehicle, a load holding member, a rotatable member associated with the road wheels of the vehicle, means for selectively driving said vehicle forwardly and reversely including a transmission with a manual shifting device operable for arranging the transmission for driving the vehicle forwardly and reversely, an automatic device comprising a system of mechanisms for preventing rotation of said rotatable member in one direction so as to prevent retrograde movement of said vehicle when said driving means is arranged for driving said vehicle forwardly, said automatic device being operatively associated with said load holding member and said rotatable member and comprising a one-way friction clutch having a pair of elements relatively rotatable in one direction only, one of said elements being connected to one of said members, a breakable connection between the other of said elements and the other of said members, said connection comprising a pivoted tooth means and radially extending tooth means carried by one of said elements, said tooth means normally being engageable, manually operable means for effecting the disengagement of said tooth means, and means for facilitating the disengagement of said tooth means, so that the force which must be exerted on said manually operable means to disengage said tooth means, when the mechanism is subjected to the maximum load of the vehicle while preventing reverse movement thereof, is approximately of the same order as the force required to operate said manual shifting device for arranging the transmission for driving the vehicle reversely.

CARL F. RAUEN.